(12) United States Patent
Guggenheim et al.

(10) Patent No.: US 10,829,594 B2
(45) Date of Patent: Nov. 10, 2020

(54) METHOD OF MAKING POLYETHERIMIDE

(71) Applicant: SABIC GLOBAL TECHNOLOGIES B.V., Bergen op Zoom (NL)

(72) Inventors: Thomas Link Guggenheim, Mt. Vernon, IN (US); Karthik Venkataraman, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 78 days.

(21) Appl. No.: 16/067,295

(22) PCT Filed: Dec. 29, 2016

(86) PCT No.: PCT/US2016/069177
§ 371 (c)(1),
(2) Date: Jun. 29, 2018

(87) PCT Pub. No.: WO2017/117378
PCT Pub. Date: Jul. 6, 2017

(65) Prior Publication Data
US 2019/0023845 A1 Jan. 24, 2019

Related U.S. Application Data

(60) Provisional application No. 62/273,600, filed on Dec. 31, 2015.

(51) Int. Cl.
*C08G 73/10* (2006.01)
*C08G 73/00* (2006.01)

(52) U.S. Cl.
CPC ..... *C08G 73/1053* (2013.01); *C08G 73/1014* (2013.01); *C08G 73/1017* (2013.01); *C08G 73/1028* (2013.01); *C08G 73/1046* (2013.01)

(58) Field of Classification Search
CPC ..................................... C08G 73/10
USPC .................................. 528/35, 353
See application file for complete search history.

(56) References Cited

U.S. PATENT DOCUMENTS

| | | |
|---|---|---|
| 3,803,085 A | 4/1974 | Takehoshi et al. |
| 3,833,546 A | 9/1974 | Takekoshi et al. |
| 3,847,867 A | 11/1974 | Heath et al. |
| 3,917,643 A | 11/1975 | Takekoshi et al. |
| 3,991,004 A | 11/1976 | Takekoshi et al. |
| 4,011,198 A | 3/1977 | Takekoshi et al. |
| 4,073,773 A | 2/1978 | Banucci et al. |
| 4,293,683 A | 10/1981 | Takekoshi et al. |
| 4,417,044 A | 11/1983 | Parekh |
| 4,443,591 A | 4/1984 | Schmidt et al. |
| 4,443,592 A | 4/1984 | Schmidt et al. |
| 4,511,535 A | 4/1985 | Schmidt et al. |
| 4,585,852 A | 4/1986 | Lo et al. |
| 4,835,249 A | 5/1989 | Gallagher et al. |
| 6,924,350 B2 | 8/2005 | Dong et al. |
| 6,949,622 B2 | 9/2005 | Silvi et al. |
| 7,053,168 B2 | 5/2006 | Silvi et al. |
| 7,122,619 B2 | 10/2006 | Silvi et al. |
| 7,411,032 B2 | 8/2008 | Stella et al. |
| 8,536,298 B2 | 9/2013 | Angermeier et al. |
| 2008/0262196 A1 | 10/2008 | Giammattei et al. |
| 2009/0029615 A1 | 1/2009 | Susarla et al. |
| 2010/0160578 A1 | 6/2010 | Odle et al. |

OTHER PUBLICATIONS

US 4,421,907 A, 12/1983, Schmidt et al. (withdrawn)
International Search Report for International Application No. PCT/US2016/069177, International Filing Date Dec. 29, 2016, dated Apr. 12, 2017, 6 pages.
Written Opinion for International Application No. PCT/US2016/069177, International Filing Date Dec. 29, 2016, dated Apr. 12, 2017, 8 pages.

*Primary Examiner* — Duc Truong
(74) *Attorney, Agent, or Firm* — Cantor Colburn LLP

(57) ABSTRACT

A method of making a polyetherimide comprising: reacting an aromatic bis(ether anhydride) with an aromatic diamine in a solvent to form a first solid/liquid mixture having a first solids content within 5% of a first target solids content; cooling the first solid/liquid mixture to a temperature within 5% of a target temperature; separating a portion of the liquid component from the cooled first solid/liquid mixture to form a second solid/liquid mixture having a second solids content within 10% of a second target solids content; and melt polymerizing the second solid/liquid mixture to form the polyetherimide.

7 Claims, No Drawings

METHOD OF MAKING POLYETHERIMIDE

CROSS REFERENCE TO RELATED APPLICATIONS

This application is a National Stage application of PCT/US2016/069177, filed Dec. 29, 2016, which claims the benefit of U.S. Provisional Application No. 62/273,600, filed Dec. 31, 2015, both of which are incorporated by reference in their entirety herein.

BACKGROUND

Polyetherimides are a known class of polymers characterized by advantageous properties such as thermal stability and solvent resistance. Various methods of making polyetherimide have been disclosed, many of which suffer from a drawback of some sort. One method involves reacting the monomers in a solvent until a polymer precipitates from the reaction mixture. The precipitated polymer does not have the desired molecular weight and so polymerization is completed by melt mixing. With this method it is difficult to simply and reliably produce a polyetherimide having a consistent molecular weight.

BRIEF DESCRIPTION

The aforementioned need is addressed by a method of making a polyetherimide comprising: reacting an aromatic bis(ether anhydride) with an aromatic diamine in a solvent to form a first solid/liquid mixture having a first solids content within 5% of a first target solids content; cooling the first solid/liquid mixture to a temperature within 5% of a target temperature; separating a portion of the liquid component from the cooled first solid/liquid mixture to form a second solid/liquid mixture having a second solids content within 10% of a second target solids content; and melt polymerizing the second solid/liquid mixture to form the polyetherimide.

Also described herein is a method of making a polyetherimide comprising: combining an aromatic bis(ether anhydride) with chain terminating agent in a solvent to form a solution; combining the solution with an aromatic diamine to form a first solid/liquid mixture having a solids content within 5% of a first target solids content; cooling the first solid/liquid mixture to a temperature within 5% of a target temperature; separating a portion of the liquid component from the cooled first solid/liquid mixture to form a second solid/liquid mixture having a solids content within 10% of a second target solids content; and melt polymerizing the second solid/liquid mixture to form the polyetherimide.

Also described herein is a method of making a polyetherimide comprising: reacting bisphenol A dianhydride with an aromatic monoamine in a solvent to form a solution; reacting the solution with p-phenylenediamine to form a first solid/liquid mixture having a solids content within 5% of a first target solids content; cooling the first solid/liquid mixture to a temperature within 5% of a target temperature; separating a portion of the liquid component from the cooled first solid/liquid mixture to form a second solid/liquid mixture having a second solids content within 10% of a second target solids content; drying the second solid/liquid mixture to form a dried second solid/liquid mixture having a solvent content less than or equal to 20% weight percent, based on the total weight of the dried second solid/liquid mixture; and melt polymerizing the dried second solid/liquid mixture.

The above described and other features are exemplified by the detailed description.

DETAILED DESCRIPTION

Reliable and consistent production results are desirable in the production of polymers. Polyetherimide production via the precipitated polymer method has suffered from within batch and run-to-run molecular weight variability. Variability in molecular weight frequently results in variability in melt index which can cause inconsistent results when using the polyetherimide to make articles, complicating the production process. Previous efforts have largely focused on stoichiometry of the reaction and the use of chain stoppers such as monoamines and monoanhydrides.

In the precipitated polymer method of making polyetherimide the diamine and bis(ether anhydride) are reacted in a solvent and the resulting polyetherimide precipitates from solution but it precipitates before the desired molecular weight is reached. To achieve the desired molecular weight the precipitated polyetherimide is melt polymerized to finish polymerization and achieve the desired molecular weight. It's been discovered that when using a precipitative process for the production of polyetherimide three factors have a remarkable impact on the molecular weight of the polyetherimide after melt polymerization, the solids content of the initial reaction, the temperature that the first solid/liquid mixture is cooled to, and the solids content of the second solid/liquid mixture. Additionally, molecular weight control can be affected by the order of reactant addition with the addition of a chain terminating agent, such as a monoamine, to the bis(ether anhydride) prior to the addition of the diamine having an impact on molecular weight control.

Polyetherimides comprise more than 1, for example 10 to 1000, or 10 to 500, or 10 to 100 structural units of formula (1)

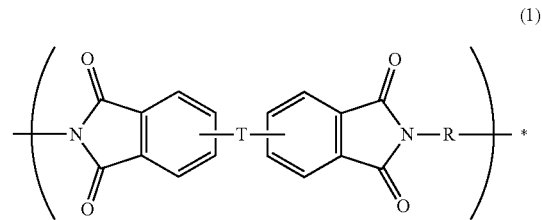

wherein each R is independently the same or different, and is a $C_{6-20}$ aromatic hydrocarbon group or a halogenated derivative thereof, in particular a divalent group of one or more of the following formulas

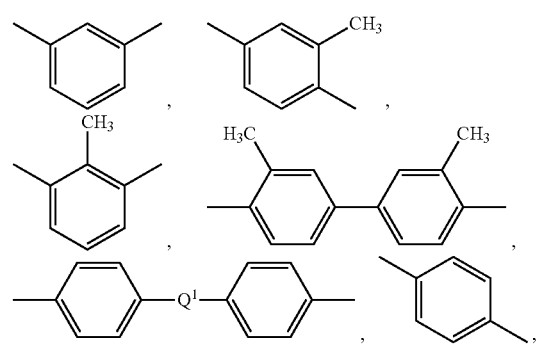

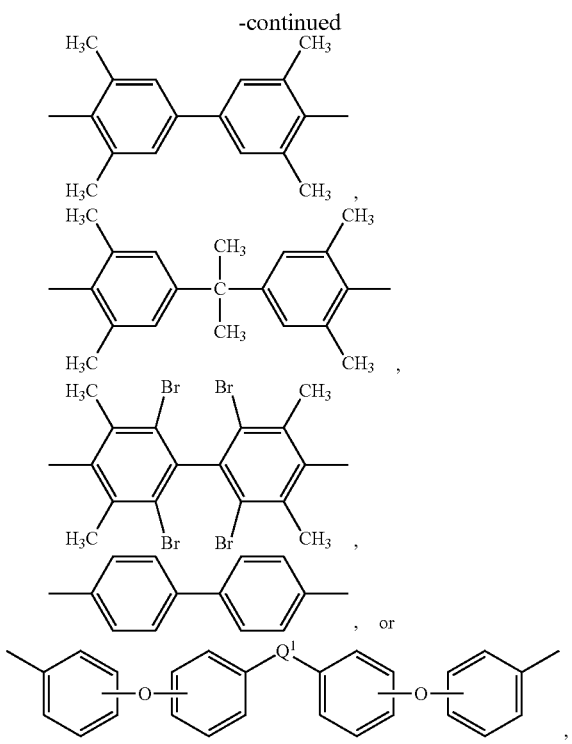

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diaryl sulfone, in particular bis(4,4'-phenylene)sulfone.

Further in formula (1), T is —O— or a group of the formula —O—Z—O— wherein the divalent bonds of the —O— or the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

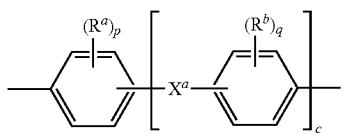

wherein $R^a$ and $R^b$ are each independently the same or different, and are a halogen atom or a monovalent C$_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group $X^a$ can be a single bond, —O—, —S—, —S(O)$_2$—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

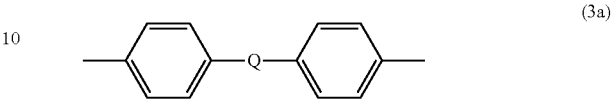

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene or p-phenylene and T is —O—Z—O— wherein Z is a divalent group of formula (3a). Alternatively, R is m-phenylene or p-phenylene and T is —O—Z—O wherein Z is a divalent group of formula (3a) and Q is 2,2-isopropylidene. Alternatively, the polyetherimide copolymer optionally comprises additional structural imide units, for example imide units of formula (1) wherein R is as described in formula (1) wherein at least 50 mole % of the R groups are of formula (2) wherein $Q^1$ is —SO$_2$— and the remaining R groups are independently p-phenylene or m-phenylene or a combination comprising at least one of the foregoing; and Z is 2,2-(4-phenylene)isopropylidene.

The polyetherimide is prepared by the reaction of an aromatic bis(ether anhydride) of formula (5) or a chemical equivalent thereof, with an organic diamine of formula (6)

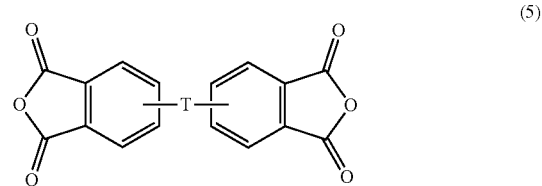

wherein T and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(ether anhydride)s include 2,2-bis[4-(3,4-dicarboxyphenoxy)phenyl]propane dianhydride (also known as bisphenol A dianhydride or BPADA), 3,3'-bis[4-(3,4-dicarboxyphenoxy)phenyl]propane dianhydride; 4,4'-bis(3,4-dicarboxyphenoxy)diphenyl ether dianhydride; 3,4' bis(3,4-dicarboxyphenoxy)diphenyl ether dianhydrides; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy)diphenyl ether dianhydride; 4,4'-bis(2,3-dicarboxyphenoxy) diphenyl sulfide dianhydride; 4,4'-bis(2,3- dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. In some embodiments the organic diamine is m-phenylenediamine, p-phenylenediamine, 4,4'-diaminodiphenyl sulfone, or a combination comprising one or more of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured by the method described in the examples.

The bis(ether anhydride) and diamine are combined in a solvent to form a mixture. A chain terminating agent can be included as well. The mixture may initially be a solution wherein in the bis(ether anhydride), diamine and optional chain terminating agent are substantially dissolved (no solids are visible to the naked eye). As the reaction between the bis(ether anhydride), diamine and optional chain terminating agent proceeds a prepolymer is formed which precipitates from the solution, forming a first solid/liquid mixture. The solution and the first solid/liquid mixture have a solids content within 5% of a first target solids content, or, within 3% of the first target solids content. Solids content, as used herein, is defined as the weight of non-solvent components divided by the total weight of the non-solvent components and solvent. Controlling the solids content of the solution and the first solid/liquid mixture helps to provide better molecular weight control of the product polyetherimide. The first target solids content can be in the range of 10 to 40%, or, more specifically, 20 to 30%, or, even more specifically, 20 to 25%.

The bis(ether anhydride), diamine and optional chain terminating agent are reacted at a temperature in a first temperature range of 100° C. to the boiling point of the solvent under the reaction conditions, or, more specifically, 100 to 180° C., or, more specifically, 130 to 180° C., or, even more specifically 170 to 180° C. Reaction conditions can include an elevated pressure such as 1 to 5 pounds per square inch gauge (psig).

In some embodiments the bis(ether anhydride) and a chain terminating agent are combined in the solvent to form a solution and the diamine is added to this solution in a separate step. This order of addition gives better control of the molecular weight of the polyetherimide.

The chain terminating agent can be a monoamine, a monoanhydride or a chemical equivalent thereof. Exemplary chemical equivalents of a monoanhydride include 1,2-dicarboxylic acids, 1,2-dicarboxylic esters, and 1,2-dicarboxylic ester acids.

Monoamines that can be used as a chain terminating agent have 3 to 24 carbon atoms, may be aliphatic or aromatic, and include, but are not limited to, substituted or unsubstituted anilines, substituted or unsubstituted napthyl amines or substituted or unsubstituted heteroaryl amines. The monoamines may have additional functionality, for instance, sulfone groups, ester groups, amide groups, halogens, alkyl ether groups, aryl ether groups, or aryl keto groups. The attached functionality should not impede the function of the chain terminating agent in controlling polyetherimide molecular weight.

Monoanhydride that can be used as a chain terminating agent have 3 to 24 carbon atoms, may be aliphatic or aromatic, and include, but are not limited to, substituted or unsubstituted phthalic anhydrides, for example, phthalic anhydride, chloro phthalic anhydride, methoxy phthalic anhydride, phenoxy phthalic anhydride, naphthyl anhydrides and the like.

The solvent can be chosen such that the bis(ether anhydride), diamine and the chain terminating agent are soluble in the solvent in the first temperature range and form a solution. "Solution" as used herein describes a situation in which the components are soluble in the solvent to the extent that no solids are visible to the naked eye at the specified temperature. Exemplary solvents include halogenated aromatics such as chloro benzene, dichlorobenzene, trichlorobenzene, and bromobenzene, aryl ethers such as phenetole, anisole and veratrole, alkylaromatics such as xylenes and toluene, nitroaromatics such as nitrobenzene, polyaryl species such as naphthylene and alkyl substituted fused aromatic systems, aryl sulfone, sulfolane and combinations comprising at least one of the foregoing. The solvent may have an atmospheric boiling point of 150° C. to 250° C.

The first solid/liquid mixture is then cooled to a temperature within 5% of a target temperature. Exemplary cooling methods include the use of internal cooling coils, an external cooling jacket, or an external heat exchanger. The target temperature can be in the range of 25 to 100° C., or, more specifically, 40 to 80° C., or, even more specifically 40 to 60° C. The solids content of the first solid/liquid mixture is maintained during the cooling.

A portion of the liquid is separated and removed from the cooled first solid/liquid mixture to form a second solid/liquid mixture having a solids content within 10% of a second target solids content. The second target solids content can be in the range of 30 to 80%, or, more specifically, 40 to 60%, or, even more specifically, 45 to 55%. The second target solids content is greater than the first target solids content. Because the solids content of the second solid/liquid mixture affects the weight average molecular weight of the polyetherimide after melt polymerization, the solids content is chosen to achieve a particular weight average molecular weight. Separation can be achieved by filtration, centrifugation, distillation, spray drying, or the like. In some embodiments centrifugation is used.

The second solid/liquid mixture can be melt polymerized to form the polyetherimide. In some embodiments the second solid/liquid mixture is dried to form a dried second solid/liquid mixture having a solvent content less than or equal to 20 weight percent, based on the total weight of the mixture. Drying occurs at a temperature greater than the boiling point of the solvent at the prevailing pressure but at a temperature less than the melting point of the solid polyetherimide in the second solid/liquid mixture. In some embodiments drying occurs at a pressure less than atmospheric pressure.

Melt polymerization can be performed in an extruder or similar melt compounding device. Typical temperatures are 300 to 420° C. and typical residence times are 30 seconds to 5 minutes. Alternatively, second solid/liquid mixture can be melt polymerized as part of the process of forming a film or coating. In such an embodiment the second solid/liquid mixture is applied to a surface and subjected to heat. In such an embodiment it is preferable to used a dried second solid/liquid mixture.

This disclosure is further illustrated by the following examples, which are non-limiting.

EXAMPLES

The examples used the following procedures.

The stoichiometry (the ratio of amine to anhydride) was determined by taking a small sample of the reaction mixture (3 to 5 mL), and determining the stoichiometry using infrared spectrometry on a 0.5 millimeter pressed film using a FTIR (Fourier Transform Infra Red) spectrometer.

The melt index was calculated by dividing the melt volume flow rate (MVR) by 10. The melt flow (MVR) was run on dried pellets as per ASTM D1238 at 337° C., using a 6.7 kilogram weight with either a 6 minute or 18 minute equilibration. MVR was measured as the amount of material that flowed from the device in cc/10 minutes, using a melt density of 1.1418 grams/cubic centimeter. Higher values indicate higher melt flow.

The intrinsic viscosity (IV) of polymer samples was determined on Model Y501C Relative Viscometer. Samples of polymer (170 to 180 milligrams (mg)) were automatically dissolved in phenol:tetrachloroethylene (70:30) at 100° C. to provide a 0.5 grams per deciliter (g/dL) sample. This sample was then injected onto the Viscometer and the viscosity automatically determined. Intrinsic viscosity (IV) measurements were done at 40° C.

Molecular weight (weight average (Mw), number average (Mn)) was analyzed by gel permeation chromatography (GPC) using a Polymer Labs Mixed Bed C 300 by 7.5 mm column, P/N 1110-6500, at 30° C. using methylene chloride as eluent, 254 nm detection, and polystyrene standards to calibrate the method. Polydispersity index (PDI) was calculated from the Mw and Mn.

Examples 1 Through 8

These examples are comparative. A 500-mL, 3-necked round-bottomed flask was equipped with overhead stirrer, and a Dean and Stark receiver topped with a reflux condenser. A nitrogen gas adapter was placed in the third neck, and a nitrogen gas exit-adapter was plumbed to the top of the condenser, which was connected to a bubbler. 80 grams (g) of bisphenol A dianhydride, 1.80 grams of aniline, and 15.46 grams of p-phenylene diamine (formulated for 0.3 mol % excess anhydride, 6.5 mol % total chain stopper) were added to the flask. The solids were rinsed into the flask with reagent grade o-dichlorobenzene (ODCB), with the total volume of solvent added to run the polymerization at the desired solids content. The amount of ODCB used resulted in a 25% solids content (Comparative examples 2-8), except for Comparative Example 1 (10% solids content). Percent solids in the reaction are defined in the following manner: grams of monomers charged, divided by the sum of grams of solvent and grams of monomers. The mixture was mechanically stirred and flask was gently flushed with nitrogen for 15 minutes at room temperature. The reaction flask was then lowered into a preheated oil bath maintained at 130° C. The reaction mixture was stirred and water began to distill into the Dean and Stark receiver. Heating was continued for 1 hour at 130° C. The oil bath temperature set point was then raised to 180° C. The reaction was heated for 1 hour after the oil achieved 180° C.

The reaction was allowed to cool overnight to room temperature and then the prepolymer was isolated by vacuum filtration using a 2.7 micrometer glass fiber filter on a Buchner funnel.

The solids content of the filtered prepolymer was determined by charging a preweighed small aluminum pan with 2 to 5 grams (weighed to the nearest mg) of the filtered prepolymer and then placing the pan on a hot plate with a surface temperature of 350° C. for 20 minutes. The pan was removed, cooled, and weighed. The solids content of the filtered prepolymer is defined as the final weight of the pan and dried prepolymer divided by the weight of the pan and the filtered, undried prepolymer.

The prepolymer was heated to a melt in an HBI System 90 Haake compounding device to finish polymerization at 340° C. for 20 minutes at 50 rpm under argon.

Results are shown in Table 1.

TABLE 1

| | Reactor Stoichiometry | | | Melt polymerization stoichiometry (Haake) | | | % solids of the filtered cake | Melt Index |
|---|---|---|---|---|---|---|---|---|
| | % solids | % diamine | % dianhydride | % diamine | % dianhydride | IV | | |
| 1* | 10 | 0.007 | 0.39 | 0.16 | 0.351 | 0.5888 | 39.2 | 0.86 |
| 2* | 25 | 0.054 | 0.396 | 0.104 | 0.332 | 0.5347 | 46.4 | 1.79 |
| 3* | 25 | 0.006 | 0.467 | 0.098 | 0.385 | 0.5171 | 38.6 | 2.42 |
| 4* | 25 | 0.057 | 0.317 | 0.096 | 0.171 | 0.5635 | 53.2 | 1.30 |
| 5* | 25 | 0.033 | 0.407 | 0.093 | 0.352 | 0.5432 | 53.2 | 1.61 |
| 6* | 25 | 0.063 | 0.443 | 0.071 | 0.355 | 0.5170 | 41.9 | 2.44 |
| 7* | 25 | 0.043 | 0.407 | 0.093 | 0.325 | 0.5450 | 35.7 | 1.85 |
| 8* | 25 | 0.041 | 0.418 | 0.086 | 0.34 | 0.5450 | 43.8 | 1.56 |

*Comparative example

It can be seen that the melt index reproducibility was poor between Examples 2-8 despite similarities in the reaction parameters. This is believed to be the result of the variation in the solids content of the filtered prepolymer. Example 1, having a solids content of 10% resulted in much lower melt index (0.86) relative to the melt indices of Examples 9-13.

Examples 9-14 were run in an experimental set up as described above. 80 grams (g) of bisphenol A dianhydride, 1.80 grams of aniline, and 15.46 grams of p-phenylene diamine (0.3 mol % diamine excess, 6.5 mol % total chain stopper) were added to the flask. The solids were rinsed into the flask with reagent grade o-dichlorobenzene (oDCB), with the total volume of ODCB used resulted in a 25% solids content. The reactions were run as described above for Examples 1-8. The solids content of the isolated prepolymer was controlled at 40%. The prepolymer was melt compounded as described above and the resulting polymer tested for intrinsic viscosity, molecular weight and melt index as described above. Results are shown in Table 2.

TABLE 2

| | Reactor Stoichiometry | | Melt polymerization stoichiometry (Haake) | | Polymer molecular weight | | | | Melt Index |
|---|---|---|---|---|---|---|---|---|---|
| | % diamine | % dianhydride | % diamine | % dianhydride | Mn | Mw | PDI | IV | |
| 9 | 0.171 | 0.734 | 0.083 | 0.195 | 15485 | 42699 | 2.76 | 0.5312 | 1.80 |
| 10 | 0.042 | 0.66 | 0.076 | 0.359 | 15462 | 41893 | 2.71 | 0.5227 | 1.91 |
| 11 | 0.071 | 0.335 | 0.092 | 0.202 | 15869 | 40878 | 2.56 | 0.5287 | 1.94 |
| 12 | 0.078 | 0.63 | 0.084 | 0.124 | 16987 | 41605 | 2.45 | 0.5321 | 1.70 |
| 13 | 0.06 | 0.254 | 0.069 | 0.094 | 16604 | 42130 | 2.54 | 0.5403 | 1.66 |

The melt index (MI) reproducibility was improved in Examples 9-13 as compared to Table 1, due to improved solids control in the prepolymer cake.

Examples 14-17

Examples 14-17 studied the impact of adding a chain terminating agent such as aniline to a hot solution of BPADA in ODCB. Without being bound by theory it is believed that when aniline is added to a cold slurry of dianhydride in solvent, more of the aniline is likely to react with the limited amount of soluble dianhydride, forming elevated levels of the bis-aniline bisimide of the dianhydride. Adding aniline to a hot solution of dianhydride ensures that the dianhydride still has at least one reactive anhydride end, since dianhydride is in excess in solution compared to aniline.

Examples 14-17 were run in an experimental set up as described above. 80 grams (g) of bisphenol A dianhydride was dissolved in reagent grade o-dichlorobenzene (oDCB) at 120-130° C. Then 1.80 gr of aniline was slowly added under nitrogen with stirring. The solutions was heated for 15 minutes and then cooled to room temperature and 15.46 grams of p-phenylene diamine (0.3 mol % diamine excess) were added to the flask under nitrogen and stirred for 30 minutes. The mixture was then heated to and maintained at 130° C. for 1 hour. The oil bath temperature set point was then raised to 180° C. The reaction was heated for 1 hour after the oil achieved 180° C. The reaction was checked for stoichiometry as described above, and once on stoichiometry, the reaction was allowed to cool overnight and then the prepolymer was isolated by vacuum filtration using a 2.7 micrometer glass fiber filter on a Buchner funnel. The solids content of the isolated prepolymer was controlled at 40%. The prepolymer was melt compounded in an HBI System 90 Haake to finish polymerization at 360° C. for 20 minutes at 50 rpm under argon. The resulting material was tested for intrinsic viscosity, molecular weight and melt index as described above. Results are shown in Table 3.

TABLE 3

| | Reactor Stoichiometry | | Melt polymerization stoichiometry (Haake) | | Polymer molecular weight | | | | Melt Index |
|---|---|---|---|---|---|---|---|---|---|
| | % diamine | % dianhydride | % diamine | % dianhydride | Mn | Mw | PDI | IV | |
| 14 | 0.064 | 0.351 | 0.076 | 0.280 | 15507 | 44439 | 2.87 | 0.5332 | 1.8 |
| 15 | 0.067 | 0.412 | 0.084 | 0.249 | 16486 | 41470 | 2.51 | 0.5323 | 1.83 |
| 16 | 0.101 | 0.334 | 0.083 | 0.263 | 15980 | 41536 | 2.6 | 0.5282 | 1.88 |
| 17 | 0.062 | 0.380 | 0.094 | 0.250 | 15432 | 40703 | 2.64 | 0.5291 | 1.92 |

The melt index reproducibility was excellent compared to the experiments recorded in Tables 1 and 2, and the stoichiometry control was also improved.

Examples 18-21

In Examples 18-21 the solids content during the initial reaction and after prepolymer isolation was intentionally varied to better understand effect on melt index. The reactions were run as described for examples 14-17. Table 4 summarizes a series of reactions done at 10% and 25% solids. It can be seen that lower reaction % solids (experiment 21 vs 19, 20 vs 18) resulted in a lower melt index polymer.

Also, higher solids content of the prepolymer cake (experiment 19 vs 18 resulted in lower melt index polymer. This is not the case at lower reaction % solids (experiment 21 vs 20), because the amount of solvent removed in going from 10% to 44% is not much higher than the amount removed in going from 10% to 25%. There is no intrinsic viscosity of Example 21 due to technical difficulties.

TABLE 4

| | Target | % solids | Reactor Stoichiometry | | Melt polymerization stoichiometry (Haake) | | | |
|---|---|---|---|---|---|---|---|---|
| | % solids during rxn | filtered cake | % diamine | % dianhydride | % diamine | % dianhydride | IV | Melt Index |
| 18 | 25 | 25.0 | 0.067 | 0.27 | 0.061 | 0.273 | 0.5142 | 2.20 |
| 19 | 25 | 44.0 | 0.067 | 0.217 | 0.1 | 0.09 | 0.5406 | 1.51 |
| 20 | 10 | 25.0 | 0.05 | 0.311 | 0.113 | 0.384 | 0.5813 | 1.01 |
| 21 | 10 | 44.0 | 0.032 | 0.566 | 0.09 | 0.371 | — | 0.94 |

Examples 22-25

Examples 22-25 were prepared as described above with regard to Examples 18-21. Results are shown in Table 5.

TABLE 5

| | Target % solids during reaction | Target % solids filtered cake | Measured % solids filtered cake | Reactor Stoichiometry | | Melt polymerization stoichiometry (Haake) | | Melt Index |
|---|---|---|---|---|---|---|---|---|
| | | | | % diamine | % dianhydride | % diamine | % dianhydride | |
| 23 | 25 | 25.0 | 24.2 | 0.037 | 0.307 | 0.069 | 0.092 | 2.58 |
| 24 | 25 | 44.8 | 39.5 | 0.052 | 0.239 | 0.103 | 0.027 | 1.46 |
| 25 | 20 | 40.0 | 36.0 | 0.066 | 0.249 | 0.094 | 0.111 | 1.45 |
| 26 | 15 | 40.0 | 37.10 | 0.068 | 0.191 | 0.085 | 0.078 | 1.20 |

Examples 23 and 24 agree with the data reported in Table 4 Further, the work suggests that running the reaction at 25 and 20% solids affords a polymer with nearly the same melt index.

This disclosure further encompasses the following embodiments.

Embodiment 1

A method of making a polyetherimide comprising: reacting an aromatic bis(ether anhydride) with an aromatic diamine in a solvent to form a a first solid/liquid mixture having a first solids content within 5% of a first target solids content; cooling the first solid/liquid mixture to a temperature within 5% of a target temperature; separating a portion of the liquid component from the cooled first solid/liquid mixture to form a second solid/liquid mixture having a second solids content within 10% of a second target solids content; and melt polymerizing the second solid/liquid mixture to form the polyetherimide.

Embodiment 2

The method of embodiment 1, wherein reacting the aromatic bis(ether anhydride) with the aromatic diamine in a solvent occurs at a temperature of 100° C. to the boiling point of the solvent under the reaction conditions.

Embodiment 3

The method of embodiment 1 or 2, wherein the first target solids content is in the range of 10 to 40%.

Embodiment 4

The method of any of the preceding embodiments, further comprising reacting a chain terminating agent with the bis(ether anhydride) and aromatic diamine.

Embodiment 5

The method of any of the preceding embodiments, wherein the second target solids content is in the range of 40 to 60% and is greater than the first target solids content.

Embodiment 6

The method of any of the preceding embodiments, wherein the first solids content is within 3% of the first target solids content.

Embodiment 7

The method of any of the preceding embodiments, further comprising drying the second solid/liquid mixture to a solvent content less than or equal to 20 weight percent, based on the total weight of the dried mixture, prior to melt polymerization.

Embodiment 8

A method of making a polyetherimide comprising: combining an aromatic bis(ether anhydride) with chain terminating agent in a solvent to form a solution; combining the solution with an aromatic diamine to form a first solid/liquid mixture having a solids content within 5% of a first target solids content; cooling the first solid/liquid mixture to a temperature within 5% of a target temperature; separating a portion of the liquid component from the cooled first solid/liquid mixture to form a second solid/liquid mixture having a solids content within 10% of a second target solids content; and melt polymerizing the second solid/liquid mixture to form the polyetherimide.

Embodiment 9

The method of embodiment 8, wherein combining the aromatic bis(ether anhydride) with the chain terminating agent in a solvent occurs at a temperature of 100 to 180° C.

Embodiment 10

The method of embodiment 8 or 9, wherein the first target solids content is in the range of 10 to 40%.

Embodiment 11

The method of any of embodiments 8 to 10, wherein the chain terminating agent comprises phthalic anhydride or aniline.

Embodiment 12

The method of any of embodiments 8 to 11, wherein the second target solids content is in the range of 40 to 60% and is greater than the first target solids content.

Embodiment 13

The method of any of embodiments 8 to 12, wherein the first solids content is within 3% of the first target solids content.

Embodiment 14

The method of any of embodiments 8 to 13, further comprising drying the second solid/liquid mixture to a solvent content less than or equal to 20 weight percent, based on the total weight of the dried mixture, prior to melt polymerization.

Embodiment 15

A method of making a polyetherimide comprising: reacting bisphenol A dianhydride with an aromatic monoamine in a solvent to form a solution; reacting the solution with p-phenylenediamine form a first solid/liquid mixture having a solids content within 5% of a first target solids content; cooling the first solid/liquid mixture; separating a portion of the liquid component from the cooled first solid/liquid mixture to form a second solid/liquid mixture having a second solids content within 10% of a second target solids content; drying the second solid/liquid mixture to form a dried second solid/liquid mixture having a solvent content less than or equal to 20% weight percent, based on the total weight of the dried second solid/liquid mixture; and melt polymerizing the dried second solid/liquid mixture.

Embodiment 16

The method of embodiment 15, wherein reacting the bisphenol A dianhydride with the aromatic monoamine in a solvent occurs at a temperature of 100 to 180° C.

Embodiment 17

The method of embodiments 15 or 16, wherein the first target solids content is in the range of 10 to 40%.

Embodiment 18

The method of any of embodiments 15 to 17, wherein the aromatic monoamine comprises aniline.

Embodiment 19

The method of any of embodiments 15 to 18, wherein the second target solids content is in the range of 40 to 60% and is greater than the first target solids content.

Embodiment 20

The method of any of embodiments 15 to 19, wherein the first solids content is within 3% of the first target solids content.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula $-C_nH_{2n-x}$ and $-C_nH_{2n-2x}-$ wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_3$-12 cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of making a polyetherimide comprising:
    reacting an aromatic bis(ether anhydride) with an aromatic diamine in a solvent to form a first solid/liquid mixture having a first solids content within 5% of a first target solids content;
    cooling the first solid/liquid mixture to a temperature within 5% of a target temperature;
    separating a portion of the liquid component from the cooled first solid/liquid mixture to form a second solid/liquid mixture having a second solids content within 10% of a second target solids content; and
    melt polymerizing the second solid/liquid mixture to form the polyetherimide.

2. The method of claim 1, wherein reacting the aromatic bis(ether anhydride) with the aromatic diamine in a solvent occurs at a temperature of 100° C. to the boiling point of the solvent under the reaction conditions.

3. The method of claim 1, wherein the first target solids content is in the range of 10 to 40%.

4. The method of claim 1, further comprising reacting a chain terminating agent with the bis(ether anhydride) and aromatic diamine.

5. The method of claim 1, wherein the second target solids content is in the range of 40 to 60% and is greater than the first target solids content.

6. The method of any of claim 1, wherein the first solids content is within 3% of the first target solids content.

7. The method of claim 1, further comprising drying the second solid/liquid mixture to a solvent content less than or equal to 20 weight percent, based on the total weight of the dried mixture, prior to melt polymerization.

* * * * *